Figure 1:
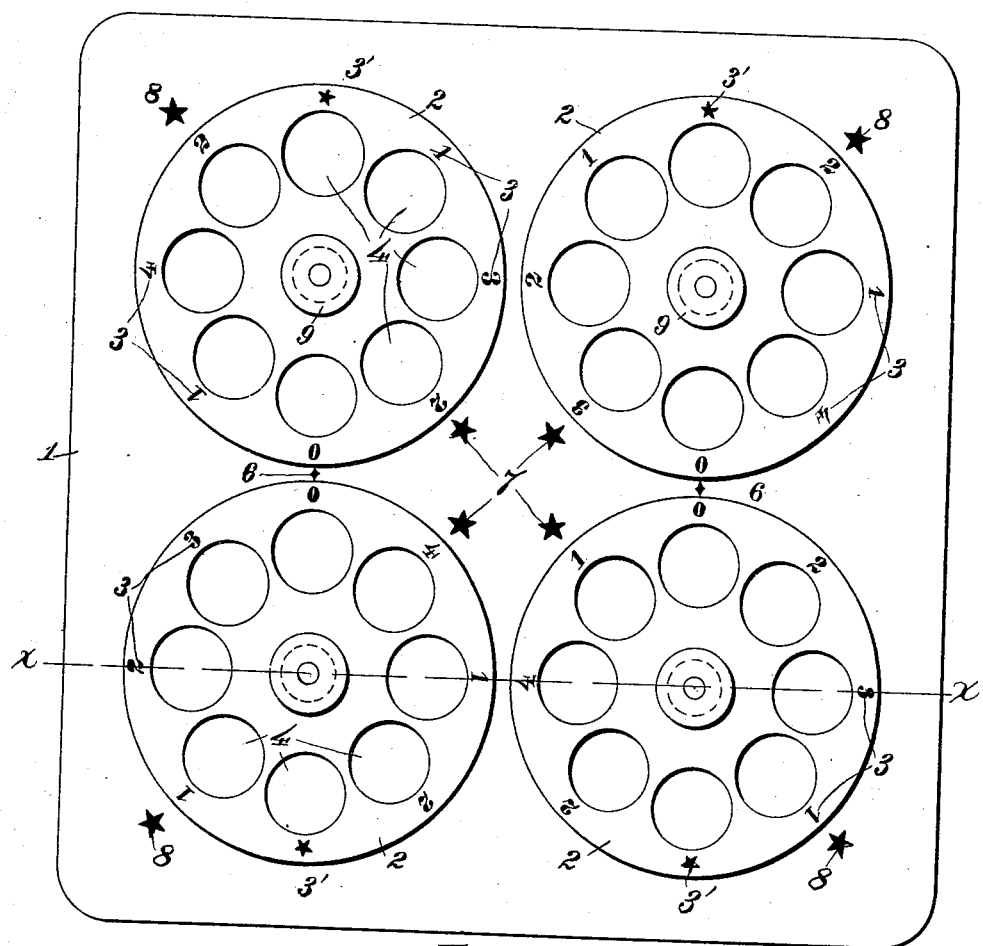

H. A. WILLIAMS.
GAME APPARATUS.
APPLICATION FILED FEB. 8, 1908.

907,663.

Patented Dec. 22, 1908.

Witnesses;
A. A. Olson
W. J. Austin

Inventor;
Howard A. Williams
by
Joshua R. H. Potts
Atty.

UNITED STATES PATENT OFFICE.

HOWARD A. WILLIAMS, OF CHICAGO HEIGHTS, ILLINOIS.

GAME APPARATUS.

No. 907,663.

Specification of Letters Patent.

Patented Dec. 22, 1908.

Application filed February 8, 1908. Serial No. 414,910.

*To all whom it may concern:*

Be it known that I, HOWARD A. WILLIAMS, a citizen of the United States, residing at Chicago Heights, county of Cook, and State of Illinois, have invented certain new and useful Improvements in Game Apparatus, of which the following is a specification.

My invention relates to a game apparatus, and is embodied in an apparatus of the class mentioned, comprising a board or plate upon which are rotatably mounted a plurality of disks, the number of disks being two or any multiple thereof, and each disk being provided with a plurality of different characters arranged at intervals about the periphery thereof, the characters on the several disks being the same but arranged in different order.

My invention further consists in a game apparatus comprising a board or plate, in combination with a plurality of disks rotatably mounted on said board and arranged in pairs, each disk being provided with a plurality of different characters arranged at intervals thereon, the characters on the several disks being the same but those of each pair of disks being arranged in a different order from each other.

My invention further consists in a game apparatus characterized as above mentioned, the disks being further provided with a plurality of pockets to receive the men or counters.

My invention further consists in various details of construction and arrangements of parts all as will be hereinafter fully described and particularly pointed out in the claims.

Figure 2:
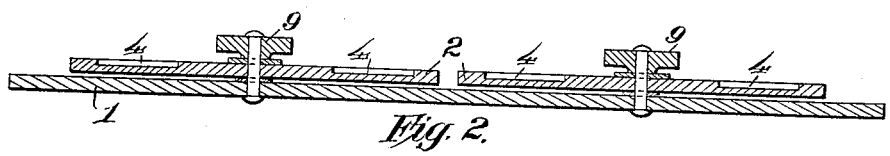
Figure 3:
Figure 4:

My invention will be more readily understood by reference to the accompanying drawings forming a part of this specification and in which, Figure 1 is a plan view of a game apparatus embodying my invention, Fig. 2 is a section on the line x—x of Fig. 1, Fig. 3 is a perspective view of a counter such as is used in playing the game, and Fig. 4 is a plan view of one of the special counters.

Referring to the drawings, 1 indicates the base board of the apparatus which is made of the required size and may be divided into several sections hingedly connected to fold into small space when not in use, if so desired. Rotatably mounted on the board, 1 are a plurality of disks, 2. The disks may be two in number or any multiple thereof and arranged in pairs, the game being designed for two players, each player operating half of the number of disks. Each disk is provided with a plurality of characters arranged at intervals around its periphery, the characters upon the disks of each pair being similar but arranged in different order. In the drawings, I have illustrated the characters as numerical digits, 3 but it will be obvious that letters or symbols may be employed without departing from the scope of my invention. It will also be obvious that any desired number of characters may be provided upon each disk. Each disk is also provided with a plurality of recesses or pockets to receive the men or counters, 5, there being the same number of pockets as there are peripheral characters, 3.

Located upon the board, 1 between the adjacent edges of each pair of disks is a symbol, 6. Adjacent to each disk the board is also provided with a pair of different symbols, preferably stars, 7 and 8. The stars 7 and 8 are arranged diametrically opposite from each other and in such a position as to register with two of the characters on the disk when one of the characters thereof registers with the symbol, 6. Each disk is further provided with a like or corresponding symbol, 3'.

In playing the game several disks are set with the "0" registering with the symbol "6" and in each of the pockets, 4 is placed a counter, 5, the pocket adjacent to the star or counter, symbol 3' being provided with a counter, bearing a corresponding symbol 5' as illustrated in Fig. 4. The players then take turns alternately, each play consisting in turning one of the disks one space to bring the next succeeding number on the periphery of the disk to register with the symbol, 6. Each player endeavors to manipulate the disks so as to make one of the symbols of his disk or disks match the symbol on his opponent's disk at the point indicated by the symbol, 6, in which event he is permitted to remove one counter from his opponent's disk. Each player being permitted to move a disk but one space at a time, it is obvious that with skill, it will be difficult to match the characters, as they approach, as the corresponding character may be skilfully guarded against by the opposing player. When a player can bring the symbol 3', that is the star, to register with the corresponding symbol, 7 he is permitted to remove two of his opponent's counters. This also may be guarded against by the other player so manipulating his disk as to make the cost greater than the gain. When the so called "star" play is made, the corresponding counter bearing star 5' is reversed, that is, turned up side down in its pocket, and the play cannot be repeated until the star on the disk is returned to a position registering with the star 8. 9 indicates the knurled heads or members to facilitate turning the disks. It should be noted that the disks are not adapted for spinning but are turned a certain measured distance at each play. The first player to win all of his opponent's counters wins the game.

Having described my invention, what I claim as new and desire to secure by Letters Patent is:

1. A game apparatus comprising a board, in combination with a plurality of disks rotatably mounted upon said board and arranged in pairs, each of said disks being provided with a plurality of different characters arranged at intervals about the periphery thereof, the characters on the several disks being the same but those of each pair being arranged in a different order, substantially as described.

2. A game apparatus comprising a board, in combination with a plurality of disks rotatably mounted on said board and arranged in pairs, each of said disks being provided with a plurality of different characters arranged at intervals about the periphery thereof the characters on the several disks being the same but arranged in a different order, and counter-holding pockets formed in the face of said disks adjacent to each of said characters, substantially as described.

3. A game apparatus comprising a board, in combination with a plurality of disks rotatably mounted on said board and arranged in pairs, each of said disks being provided with a plurality of different characters arranged at intervals about the periphery thereof, said board being provided with a symbol between the adjacent edges of each pair of disks and a symbol remote from the first said symbol, and one of said characters on each disk being similar to the last said symbol, as and for the purpose specified.

4. A game apparatus comprising a board, in combination with a plurality of disks rotatably mounted thereon and arranged in pairs, each of said disks being provided with a plurality of different characters arranged at intervals about the periphery thereof, said characters being the same but arranged in different order, said board being provided with a symbol between the adjacent edges of each pair of disks and a pair of other symbols arranged adjacent to each of the said disks and diametrically opposite from each other, and one of the characters on each of the disks being similar to the last named symbols, as and for the purpose specified.

In testimony whereof I have signed my name to this specification in the presence of two subscribing witnesses.

HOWARD A. WILLIAMS.

Witnesses:
W. J. HORGAN,
FREDK. WILKENING.